United States Patent
Giffords (10) Patent No.: US 6,988,054 B2
(45) Date of Patent: Jan. 17, 2006

(54) STORAGE SYSTEM PERFORMANCE METRIC COMPARISON METHODS, STORAGE SYSTEM PERFORMANCE MONITORING SYSTEMS, DATA STORAGE SYSTEMS, AND ARTICLES OF MANUFACTURE

(75) Inventor: Robert Giffords, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 152 days.

(21) Appl. No.: 10/307,023

(22) Filed: Nov. 27, 2002

(65) Prior Publication Data

US 2004/0102925 A1 May 27, 2004

(51) Int. Cl.
*G06F 19/00* (2006.01)
*G11B 20/18* (2006.01)

(52) U.S. Cl. .................. 702/186; 711/100; 711/114; 369/53.1

(58) Field of Classification Search ............... 702/186, 702/182; 711/100, 114; 369/53.1
See application file for complete search history.

(56) References Cited

U.S. PATENT DOCUMENTS

| | | | | |
|---|---|---|---|---|
| 5,088,058 A | * | 2/1992 | Salsburg ..................... | 703/25 |
| 5,245,638 A | * | 9/1993 | Gustafson ................... | 714/47 |
| 5,325,505 A | * | 6/1994 | Hoffecker et al. .......... | 707/101 |
| 5,623,598 A | * | 4/1997 | Voigt et al. .................. | 714/47 |
| 5,832,204 A | | 11/1998 | Apperley et al. | |
| 5,913,073 A | * | 6/1999 | LeCrone ...................... | 710/15 |
| 5,930,497 A | * | 7/1999 | Cherian et al. .............. | 703/21 |
| 6,061,761 A | * | 5/2000 | Bachmat ..................... | 711/114 |
| 6,088,766 A | * | 7/2000 | Bachmat et al. ............ | 711/114 |
| 6,230,217 B1 | * | 5/2001 | Tuccio et al. ................ | 710/8 |

(Continued)

OTHER PUBLICATIONS

Internet web page entitled "DFSMS Optimizer" at www.storage.ibm.com/software/opt/overview/performance_analyzer.html, date unknown.*
IBM document entitled "MVS Storage Management SmoothStart Services: DFSMS Optimizer Quick-Use- General Information Manual", Mar. 1996.*
Chen et al., "Storage Performance—Metrics and Benchmarks", IEEE, 1993.*
"HP OvenView Storage Optimizer Product Brief Storage Area Manager"; Hewlett Packard Company; Aug. 2002; pps. 1–4.
"HP Storage, hp OpenView, Storage Area Manager"; www.openview.hp.com/go/sam; Sep. 2002; 4 pps.

*Primary Examiner*—Patrick J. Assouad (57) ABSTRACT

Storage system performance metric comparison methods, storage system performance monitoring systems, data storage systems, articles of manufacture, and data signals are described. According to one aspect, a storage system performance metric comparison method includes accessing first performance metric data comprising a plurality of data values with respect to a first storage system configured to store digital data, accessing second performance metric data comprising a plurality of data values with respect to a second storage system configured to store digital data, establishing a common representation format for the first performance metric data and the second performance metric data, arranging at least some of the data values of the first performance metric data according to the common representation format, and arranging at least some of the data values of the second performance metric data according to the common representation format.

41 Claims, 4 Drawing Sheets

U.S. PATENT DOCUMENTS

| | | | |
|---|---|---|---|
| 6,349,359 B1 | | 2/2002 | Gittins et al. |
| 6,366,981 B1 | * | 4/2002 | Koike ........................ 711/114 |
| 6,378,013 B1 | * | 4/2002 | Hanson ...................... 710/100 |
| 6,453,269 B1 | * | 9/2002 | Quernemoen ............... 702/186 |
| 6,480,930 B1 | * | 11/2002 | Zakai et al. ................ 711/105 |
| 6,487,562 B1 | * | 11/2002 | Mason et al. ............... 707/205 |
| 6,584,545 B2 | * | 6/2003 | Bachmat et al. ............ 711/114 |
| 6,601,133 B2 | * | 7/2003 | Zakai et al. ................ 711/105 |
| 6,611,896 B1 | * | 8/2003 | Mason et al. ............... 711/114 |
| 6,622,221 B1 | * | 9/2003 | Zahavi ....................... 711/154 |
| 6,665,771 B1 | * | 12/2003 | Michel et al. .............. 711/112 |
| 6,691,067 B1 | * | 2/2004 | Ding et al. ................. 702/186 |
| 6,711,649 B1 | * | 3/2004 | Bachmat et al. ............ 711/114 |
| 2002/0095532 A1 | | 7/2002 | Surugucchi et al. |
| 2002/0174267 A1 | * | 11/2002 | Erdmenger et al. ......... 709/330 |
| 2003/0110250 A1 | * | 6/2003 | Schnitzer et al. ........... 709/224 |
| 2004/0032420 A1 | * | 2/2004 | Allen et al. ................. 345/700 |
| 2004/0103181 A1 | * | 5/2004 | Chambliss et al. ......... 709/223 |

* cited by examiner

STORAGE SYSTEM PERFORMANCE METRIC COMPARISON METHODS, STORAGE SYSTEM PERFORMANCE MONITORING SYSTEMS, DATA STORAGE SYSTEMS, AND ARTICLES OF MANUFACTURE

FIELD OF THE INVENTION

At least some aspects of the invention relate to storage system performance metric comparison methods, storage system performance monitoring systems, data storage systems, articles of manufacture, and data signals.

BACKGROUND OF THE INVENTION

Computer systems including hardware, software, firmware, etc. have continued to experience expansive growth and sophistication in recent years. Peripherals and other components arranged to interface with computer systems have also experienced expansive improvements. In addition, computer systems are generally used in an increasing number of applications including applications containing networking solutions enabling communication between remotely spaced computers. For example, computer systems may be utilized in client applications, server applications as well as stand-alone personal computing applications.

With the increased processing speeds of computer systems, and the increasing usage of computer systems in new and varied applications, devices are desired to assist with storing and quickly accessing data processed and used by computer systems. Mass storage devices have been developed to accommodate relatively large amounts of digital data utilized by computer systems. Redundant storage systems have been developed to provide continued, correct operations during the presence of a fault or other failure in a component or peripheral of a computer system. Three primary design criteria may be typically considered when developing mass storage devices and include cost (low cost per unit of data storage), high input/output performance, and availability (ability to recover data even though some components have failed and to insure continued operation). Redundant array of independent disk (RAID) systems have been utilized to provide redundant storage of relatively large amounts of data.

It is beneficial to monitor activity upon one or more storage system. However, if plural storage systems are utilized, individual ones of the systems may be monitored and provide performance information according to respective individual and independent schemes. At least some aspects described herein relate to improvements with respect to data regarding operations of the storage systems.

DESCRIPTION OF THE DRAWINGS

FIG. 6 is a flow chart of an exemplary methodology for arranging and communicating performance metric data.

FIG. 7 is a flow chart of an exemplary methodology for normalizing performance metric data of a plurality of storage systems.

DETAILED DESCRIPTION OF THE INVENTION

Aspects of the present invention provide apparatus and methods for determining data comparison points for analyzing performance metric data of more than one storage system enabling comparison of performance metrics between the multiple storage systems. Some aspects accommodate storage systems which provide performance metric data at different time intervals as well as changes in data collection intervals during a comparison period. Aspects of the invention provide exemplary comparison procedures which are relatively simple to calculate, may typically remove extra data comparison points resulting in faster computations, and may remove unnecessary data points making trends more evident.

According to one aspect of the invention, a storage system performance metric comparison method may comprise accessing first performance metric data comprising a plurality of data values with respect to a first storage system configured to store digital data, accessing second performance metric data comprising a plurality of data values with respect to a second storage system configured to store digital data, establishing a common representation format for the first performance metric data and the second performance metric data, arranging at least some of the data values of the first performance metric data according to the common representation format, and arranging at least some of the data values of the second performance metric data according to the common representation format.

According to another aspect of the invention, a storage system performance monitoring system may comprise a communications interface configured to access first performance metric data comprising a plurality of data values with respect to a first storage system configured to store digital data and second performance metric data comprising a plurality of data values with respect to a second storage system configured to store digital data and processing circuitry configured to access the first performance metric data and the second performance metric data, to provide a plurality of timing values, and to provide one of the data values of the first performance metric data and one of the data values of the second performance metric data for individual ones of the timing values.

According to an additional aspect of the invention, a data storage system may comprise a first storage means for storing digital data and providing first performance metric data comprising a plurality of data values with respect to storage operations of the first storage means, a second storage means for storing digital data and providing second performance metric data comprising a plurality of data values with respect to storage operations of the second storage means, and a performance monitoring means for accessing the first performance metric data and the second performance metric data, providing a common representation format responsive to the accessed first performance metric data and the second performance metric data, and arranging the first performance metric data and the second performance metric data according to the common representation format.

According to yet another aspect of the invention, an article of manufacture may comprise a processor-usable medium comprising processor-usable code configured to cause processing circuitry to access first performance metric data comprising a plurality of data values with respect to a first storage system configured to store digital data, access second performance metric data comprising a plurality of data values with respect to a second storage system configured to store digital data, provide a plurality of timing values, and associate one of the data values of the first performance metric data and one of the data values of the second performance metric data with individual ones of the timing values.

According to yet another aspect of the invention, a data signal embodied in a transmission medium may comprise processor-usable code configured to cause processing circuitry to access first performance metric data comprising a plurality of data values with respect to a first storage system configured to store digital data, processor-usable code configured to cause processing circuitry to access second performance metric data comprising a plurality of data values with respect to a second storage system configured to store digital data, processor-usable code configured to cause processing circuitry to establish a common representation format for the first performance metric data and the second performance metric data, processor-usable code configured to cause processing circuitry to arrange the first performance metric data according to the common representation format, and processor-usable code configured to cause processing circuitry to arrange the second performance metric data according to the common representation format.

Figure 1:
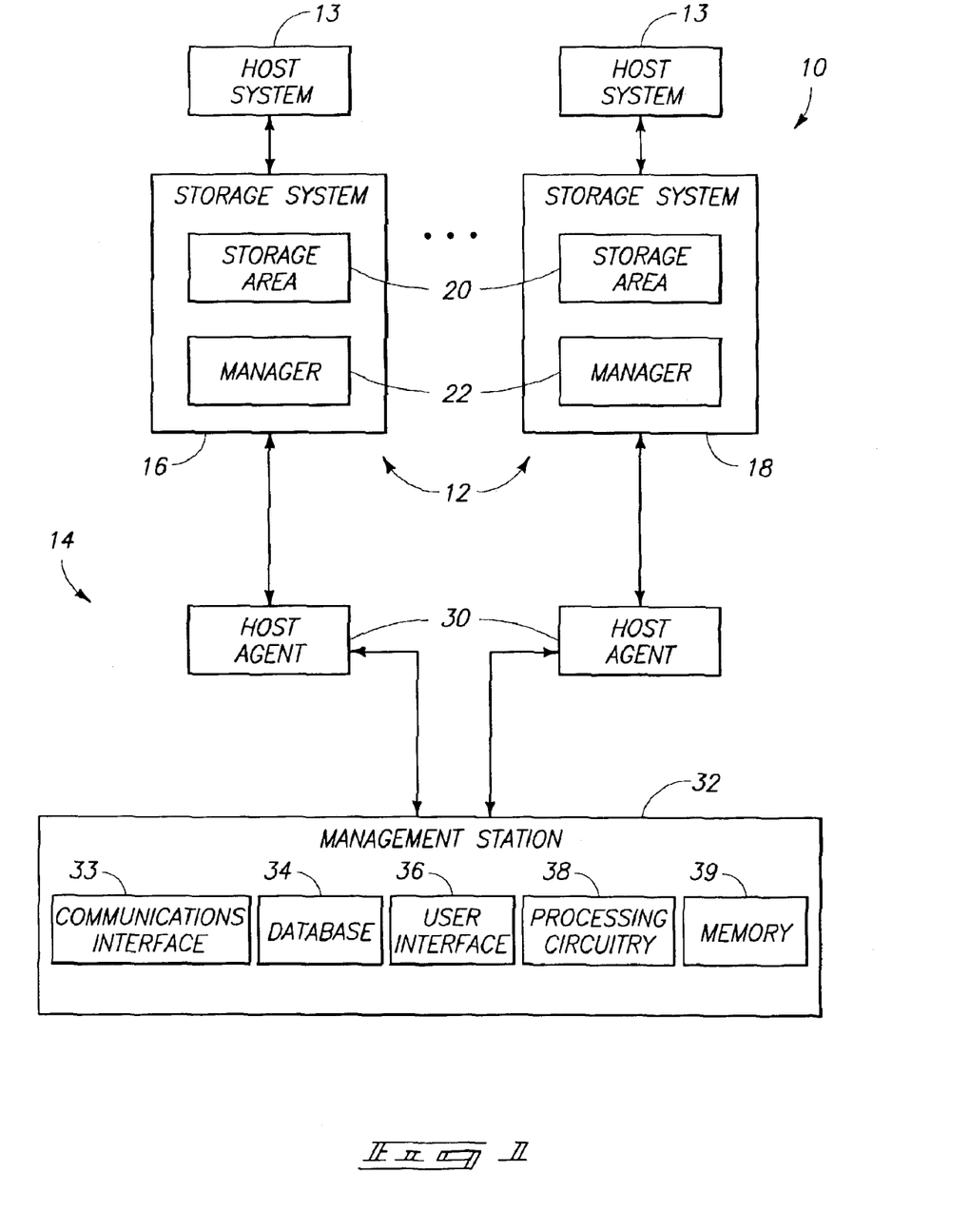
FIG. 1 is a functional block diagram of an exemplary data storage system.

Referring to FIG. 1, an exemplary data storage system 10 is illustrated. The depicted data storage system 10 includes a plurality of storage systems 12 and a performance monitoring system 14. Exemplary storage systems 12 shown in FIG. 1 include respective storage areas 20 and respective managers 22. Although two storage systems 12 are shown in FIG. 1, data storage system 10 may include additional storage systems 12. One of storage systems 12 may be referred to as a first storage system 16 and the other of storage systems 12 may be referred to as a second storage system 18. In one arrangement, storage systems 12 comprise independent mass storage systems configured to store digital data independent from one another. For example, storage systems 12 may be arranged as RAID storage systems, direct attached systems, network attached systems, and/or storage area network systems in exemplary embodiments. Other storage system configurations are possible. Storage systems 12 may provide storage of digital data from host computing systems 13 or from other associated sources of the digital data.

Storage area 20 of an individual storage system 12 may include a plurality of physical disks configured to store digital data. Manager 22 may be implemented as a dedicated microcontroller configured to control operations of storage system 12 including storage of data within storage area 20 and accessing of stored data therein. As discussed further below, manager 22 may also monitor and provide performance metric data of the respective storage systems 12. Exemplary performance metric data includes information regarding storage operations of a respective storage system 12 at a plurality of moments in time. For example, performance metric data may include raw activity data with respect to storage area 20 including input/output operations, sequential read or write operations, random read or write operations, microprocessor usage, usage of ports of respective storage systems 12 in communication with host systems 13, etc. Manager 22 may be implemented using RAID manager library software, which may be provided in a XP1024 storage system available from Hewlett-Packard Company, in one embodiment. Other configurations are possible for providing performance metric data.

Monitoring system 14 is arranged to monitor operations of the respective storage systems 12, including accessing performance metric data of the storage systems 12, and to provide comparison operations with respect to the performance metric data. As described further below, monitoring system 14 may be arranged in at least one embodiment to define a common representation format responsive to the accessed data, and to arrange the performance metric data according to the common representation format to facilitate comparison of the performance metric data by a user or other entity.

In the depicted embodiment, monitoring system 14 includes a plurality of host agents 30 and a management station 32. Host agents 30 are coupled with respective storage systems 12 and are configured to interface with managers 22 of the respective storage systems 12, for example, using API calls. Host agents 30 may be implemented as Unix, Windows, Linux, Sun or other workstations in exemplary configurations. In other implementations, one or more host agent 30 may be utilized to individually monitor and/or interface with a plurality of storage systems 12.

Management station 32 interfaces with host agents 30 and is arranged to implement configuration or set-up operations for systems 12, alarm operations for systems 12, and operations pertinent to storage and comparison of performance metric data obtained from respective host agents 30 for respective systems 12. In the illustrated exemplary configuration, management station 32 includes a communications interface 33, a database 34, a user interface 36, processing circuitry 38 and memory 39.

Communications interface 33 implements communications of management station 14 with respect to external devices, such as host agents 30, or directly with storage systems 16, 18 without the use of host agents. For example, communications interface 33 may be embodied as a network interface card (NIC) in one arrangement.

User interface 36 is arranged to visually depict information for a user and may also receive user input or commands. In one embodiment, user interface 36 is implemented as a display including a graphical user interface (GUI) configured to visually depict information for a user. User interface 36 may also include a keyboard or other input device configured to receive user input.

Processing circuitry 38 of management station 32 is configured to retrieve or access performance metric data from database 34, from host agents 30 or from respective storage systems 12. Processing circuitry 38 is configured to arrange accessed performance metric data into a desired format and to control user interface 36 to display or otherwise communicate the arranged performance metric data to a user. Processing circuitry 38 may be implemented as a microprocessor, application specific integrated circuit (ASIC), or other appropriate processing device in exemplary arrangements. Processing circuitry 38 may execute executable instructions stored within articles of manufacture, such as memory 39, mass storage devices (e.g., hard disk drives, floppy disks, optical disks, etc.) or within another appropriate device, and embodied as, for example, software and/or firmware instructions. Exemplary operations performed by processing circuitry 38 relative to arrangement of performance metric data of storage systems 12 are described below.

Memory 39 is arranged to store digital information and instructions. Memory 24 may be embodied as random access memory (RAM), read only memory (ROM), flash memory or other configurations capable of storing digital information and instructions (e.g., software or firmware instructions utilized by processing circuitry 38), or any other digital data desired to be stored. A hard disk or other storage device may also be provided-to store digital information and instructions.

Figure 2:
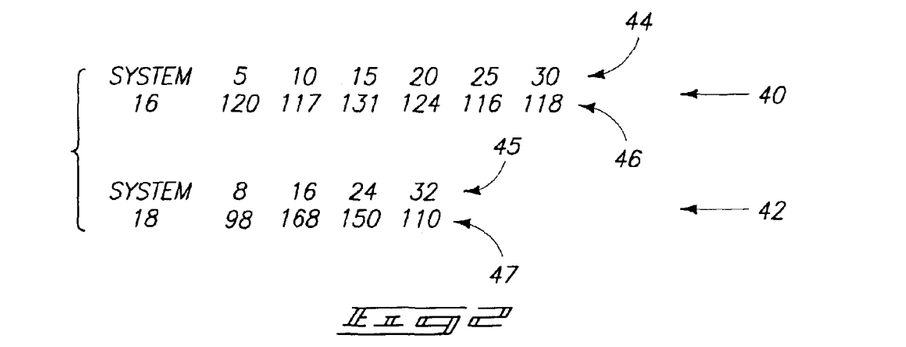
FIG. 2 is an illustrative representation of exemplary performance metric data of two storage systems of the system of FIG. 1.

It may be desired to monitor activity of data storage system 10 including activities of individual storage systems 12. Referring to FIG. 2, data indicative of operations of storage systems 16, 18 is depicted as respective representations 40, 42. The representations 40, 42 individually include respective timing patterns 44, 45 and respective performance metric data 46, 47. The respective timing patterns 44, 45 individually include a plurality of timing values (e.g., minutes) corresponding to collection times of a plurality of respective data values of the performance metric data 46, 47 for the respective storage systems 16, 18. As illustrated in FIG. 2, performance metric data 46, 47 of respective systems 16, 18 is obtained according to timing patterns 44, 45 which are arranged to indicate times of acquisition of performance metric data 46, 47 within storage systems 16, 18.

In the depicted exemplary illustration, storage system 16 is configured to provide performance metric data 46 collected according to timing pattern 44 wherein timing values occur at five minute intervals corresponding to respective data values of the performance metric data 46. Storage system 18 is configured in the illustrated example to provide performance metric data 47 including data values corresponding to timing pattern 46 having timing values at eight minute intervals. The data values of performance metric data 46, 47 correspond to monitored activities (e.g., I/O operations per second) of the respective storage systems 16, 18 in the illustrated example.

Accordingly, in one embodiment, manager 22 of storage system 16 obtains data values of the performance metric data 46 of storage system 16 at five minute intervals corresponding to the respective timing pattern 44. Manager 22 of storage system 18 obtains data values of the performance metric data 47 of storage system 18 at eight minute intervals corresponding to the respective timing pattern 45.

The respective host agents 30 receive the respective performance metric data 46, 47 and timing patterns 44, 45 from the respective managers 22 of storage systems 16, 18. The performance metric data 46, 47 and timing patterns 44, 45 may be forwarded from the respective host agents 30 to management station 32. Processing circuitry 38 is arranged to store the performance metric data 46, 47 and timing patterns 44, 45 within database 34.

At subsequent moments in time, a user may wish to compare or otherwise analyze monitored data (e.g., performance metric data) of the storage systems 12. In one embodiment, processing circuitry 38 may receive a user command from user interface 36 and operate to provide data regarding storage systems 12 to the user, for example, via user interface 36, by storing an appropriate file, by formulating communications including the data for communication externally of management station 32 (e.g., e-mail), and/or using another appropriate format for communications.

In one embodiment, processing circuitry 38 is configured to establish a common representation format to present data regarding operations of storage systems 12 to a user. Processing circuitry 38 may establish the common representation format from a plurality of possible formats, for example, from first performance metric data 46 and second performance metric data 47, or independent of such data. Following the establishment of the common representation format, the processing circuitry may arrange the first performance metric data 46 and the second performance metric data 47 according to the common representation format. The performance metric data may be communicated to the user and/or stored in accordance with the common representation format.

According to one possible comparison protocol, a greatest common multiple (GCM) period of time between the storage systems 12 being monitored may be identified. The greatest common multiple could be utilized as a base comparison period of the plurality of storage systems 12 to provide a common representation format for use in comparing data values of the respective storage systems 12.

Figure 3:
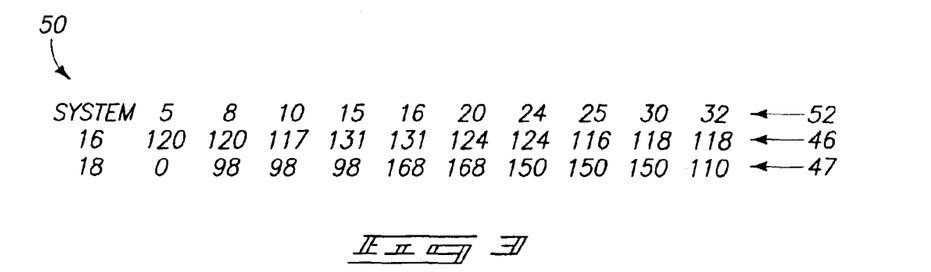
FIG. 3 is an illustrative representation of performance metric data arranged according to an exemplary common representation format.
Figure 4:
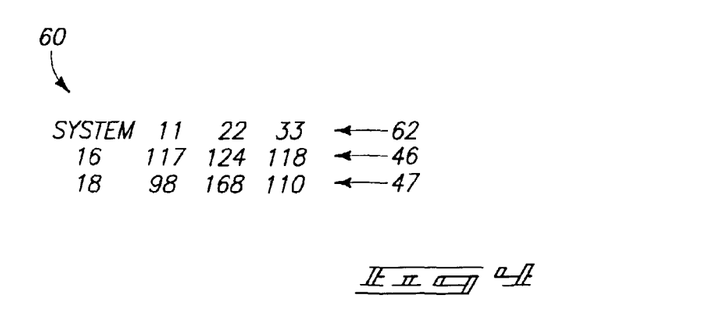
FIG. 4 is an illustrative representation of performance metric data arranged according to another exemplary common representation format.
Figure 5:
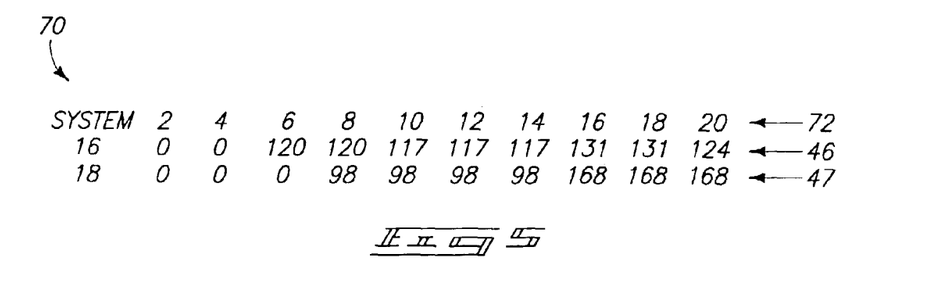
FIG. 5 is an illustrative representation of performance metric data arranged according to yet another exemplary common representation format.

Examples of other possible common representation formats shown in FIGS. 3, 4, and 5 provide advantages over utilization of the greatest common multiple (GCM) period of time as a base comparison. The exemplary aspects of FIGS. 3-5 reduce complexity compared with the GCM approach. For example, the GCM approach may increase in complexity if a data acquisition interval changes within the comparison period (e.g., uncertainty whether to use a GCM of three or six may be presented when one storage system collects at six minutes and a second system initially collects at an interval of three minutes and is subsequently changed to a collection rate of six minutes). Further, utilization of GCM approach can lead to an overabundance of comparison points. For example, if one system has data collected at fifteen minute intervals and a second system collects data at twenty eight minute intervals, the ensuing comparisons may have data points at every minute despite the fact that data changes no faster than every fifteen minutes for one of the storage systems and even more slowly for the other of the storage systems. The examples of FIGS. 3–5 may remove extraneous data-comparison points and at worst operate similar to the GCM approach.

Referring to FIG. 3, one possible common representation format 50 for performance metric data 46, 47 of storage systems 16, 18 is depicted. The illustrated exemplary common representation format 50 includes a timing pattern 52 having a plurality timing values. Common representation format 50 depicts data values at moments in time wherein the data of one or the other of the storage systems 16, 18 has potentially changed. In the depicted example, if one of systems 16, 18 has not been data-collected at a given timing value (e.g., the respective performance metric data 46, 47 has no respective data value at one of the timing values of timing pattern 52), a data value may be created or provided at the given timing value of timing pattern 52 from the most recent prior timing value of patterns 44, 45 which was collected for the respective storage system 16, 18.

In the format of FIG. 3, the timing values of timing pattern 52 individually correspond to respective ones of the timing values of the timing patterns 44, 45 of the data to be compared (e.g., minutes 5, 8, 10, 15, 16, etc.). Accordingly, in the example of FIG. 3, the timing values of timing pattern 52 also correspond to data values of performance metric data 46, 47. Timing values of timing pattern 52 may be defined corresponding to the timing values of the respective timing patterns 44, 45 of the respective storage systems 16, 18 in the illustrated example.

In the described example of format 50, respective data values of performance metric data of both storage systems 16, 18 are provided at individual timing values of the timing pattern 52. As mentioned above, processing circuitry 38 may create new data values of the performance metric data 46, 47 of storage systems 16, 18 corresponding to the timing values of the timing pattern 52 (and corresponding to timing values of the timing patterns 44, 45 of the storage systems 16, 18) and where data values have not already been collected for storage systems 16, 18. New data values of performance metric data 46 of system 16 may be created for one or more timing value of timing pattern 45 of storage system 18 and new data values of performance metric data 47 of system 18 may be created for one or more timing value of timing pattern 44 of storage system 16.

Referring to FIG. 4, another possible common representation format 60 is shown. Format 60 is generated by processing circuitry 38 and includes a uniform timing pattern 62 including a plurality of timing values separated from adjacent timing values by a uniform amount of time. In the example of FIG. 4, adjacent timing values of timing pattern 62 are separated by intervals of eleven minutes. A user may select the uniform amount of time, a default value may be utilized, or another procedure may be utilized to provide the uniform amount of time.

Processing circuitry 38 operates to arrange performance metric data of the storage systems 16, 18 according to the uniform timing pattern 62 of common representation format 60. Some of the timing values of timing pattern 62 may not have associated timing values within timing patterns 44, 45. In such situations, processing circuitry 38 may select, for a given timing value of pattern 62, the data value of the closest prior timing value of the respective timing patterns 44, 45 for the given timing value of pattern 62. As illustrated, some of the data values of performance metric data 46, 47 for individual storage systems 16, 18 are disregarded with the exemplary interval of eleven minutes shown in FIG. 4.

Referring to FIG. 5, the common representation format 70 includes a uniform timing pattern 72 having a uniform interval of two minutes between adjacent timing values for displaying performance metric data of storage systems 16, 18. New data values may be created from the performance metric data 46, 47 to provide data values for individual ones of the timing values of the uniform timing pattern 70 as described above.

The data illustrated in the exemplary formats of FIGS. 4 and 5 according to the uniform timing patterns 62, 72 illustrates an even distribution of data. The data values for the storage systems 16, 18 may be deleted, created and/or arranged according to the timing values of the respective uniform time interval. The timing values of the uniform timing patterns 62, 72 may be referred to as uniform timing values. Smoothing of the time interval intermediate adjacent timing values provided by uniform timing patterns 62, 72 may lead to a loss of data granularity as presented by timing pattern 62 or an increase in the number of data points as illustrated by timing pattern 72. In addition, the uniform time interval may be changed in a representation of data if desired.

Accordingly, performance metric data 46, 47 may be depicted in a plurality of different formats according to different aspects or embodiments. Common representation format 50 of FIG. 3 provides timing pattern 52 including a plurality of timing values corresponding to the respective timing patterns 44 of storage systems 16, 18. The common representation formats 60, 70 of FIGS. 4 and 5 provide respective timing patterns 62, 72 which may be substantially independent of the timing patterns 44, 45 illustrated in FIG. 2.

Referring to FIGS. 6 and 7, exemplary methodologies executable by processing circuitry 38 of management station 32 are shown. The methodologies of FIGS. 6 and 7 may be executed using other appropriate processing circuitry in other arrangements. The appropriate processing circuitry may execute executable code to implement the depicted methodologies. Further, other methodologies using more, less or alternative steps may be utilized.

Referring initially to FIG. 6, the management station or other device receives a request at a step S10 to analyze performance metric data of the storage systems.

At a step S12, the processing circuitry operates to access the data values of the performance metric data to be compared and the respective timing values from database 34 for the respective storage systems.

At a step S14, the processing circuitry determines whether more than one storage system is to be analyzed pursuant to the request.

If the condition of step S14 is negative, the processing circuitry proceeds to a step S20.

If the condition of step S14 is affirmative, the processing circuitry proceeds to a step S16 to normalize data of the appropriate datasets (e.g., data values and timing values). In one example, performance metric data of two storage systems is identified at step S16 and normalized.

At a step S18, it is determined whether the request is for datasets of additional storage systems.

If the condition of step S18 is affirmative, the processing circuitry proceeds to step S16 to normalize the additional data of the additional storage system with the previously normalized data. The additional data may be normalized using the existing timing values of the timing pattern of the common representation format of the normalized data in one exemplary aspect. In another aspect, additional timing values may be added to the timing pattern of the common representation format of the normalized data and which correspond to additional timing and data values of the additional storage system. Data values of the previously normalized systems may be created for such new timing values.

If the condition of step S18 is negative, the data may be displayed or otherwise communicated using an appropriate common representation format at step S20.

Referring to FIG. 7, an exemplary methodology is illustrated for normalizing data of plural storage systems and corresponding to the exemplary common representation format shown in FIG. 3. The methodology of FIG. 7 may be utilized in one example to implement step S16 of FIG. 6.

At a step S30, the processor identifies the earliest unchecked timing value of two storage systems being analyzed. For the example shown in FIG. 3, the earliest unchecked timing value is 5 of storage system 16. The earliest unchecked timing value and the data value of the respective storage system 16 for the respective timing value is added to the normalized dataset to be depicted.

At step S32, the earliest unchecked timing value is added as a new data point in the performance metric data of storage system 18.

At step S34, a new data value is provided for the newly created data point of storage system 18 and is equal to the last known data value for the respective system 18. In the example of FIG. 3, a value of 0 is provided for the new timing value for storage system 18 since there was no last known data value.

At step S36, it is determined whether more unchecked data points exist.

The depicted methodology may terminate if the condition of step S36 is negative.

If the condition of step S36 is affirmative, the process loops to step S30. During a subsequent pass through the illustrated methodology, the processing circuitry may obtain the next earliest unchecked timing value (e.g., value 8 of storage system 18) as shown in FIG. 3. The respective data value of storage system 18 would be utilized as the data value for storage system 18.

At step S32, the timing value of step S30 is added to the performance metric data of storage system 16 as another data point.

At step S34, a new data value for the newly added timing value is set to equal the last known value for the respective system 16 (e.g., the last known value of 120 is selected for minute 8 in the example of FIG. 3 for system 16).

The methodology of FIG. 7 may be repeated until all desired timing values and respective data values are provided for the appropriate storage systems to complete the normalization procedure.

At least some of the aspects of the invention may be implemented using processor-usable or executable code stored within appropriate storage devices or communicated via a network or using other transmission media. For example, processor-usable code may be provided via articles of manufacture, such as an appropriate processor-usable medium comprising, for example, a floppy disk, hard disk, zip disk, optical disk, etc., or alternatively embodied within a transmission medium, such as a carrier wave and/or data packets, and communicated via a network, such as the Internet or a private network or other communication structure.

The protection sought is not to be limited to the disclosed embodiments, which are given by way of example only, but instead is to be limited only by the scope of the appended claims.

What is claimed is:

1. A storage system performance metric comparison method comprising:
   accessing first performance metric data comprising a plurality of data values with respect to a first storage system configured to store digital data;
   accessing second performance metric data comprising a plurality of data values with respect to a second storage system configured to store digital data;
   using processing circuitry, establishing a common representation format for the first performance metric data and the second performance metric data;
   arranging at least some of the data values of the first performance metric data according to the common representation format; and
   arranging at least some of the data values of the second performance metric data according to the common representation format.

2. The method of claim 1 wherein the accessings comprise accessing the first performance metric data including the data values provided according to a first timing pattern and accessing the second performance metric data including the data values provided according to a second timing pattern different than the first timing pattern.

3. The method of claim 2 wherein the establishing comprises establishing the common representation format including a plurality of timing values according to the first and the second timing patterns.

4. The method of claim 3 wherein the arrangings comprise arrangings to provide the at least some data values of the first performance metric data and the at least some data values of the second performance metric data according to the timing values of the common representation format.

5. The method of claim 3 wherein the arrangings comprise arrangings to provide one of the data values of the first performance metric data and the one of the data values of the second performance metric data for individual ones of the timing values of the common representation format.

6. The method of claim 5 further comprising creating new data values for a respective one of the first performance metric data and the second performance metric data corresponding to timing values of the other of the first timing pattern and the second timing pattern.

7. The method of claim 5 further comprising creating new data values of the first performance metric data for at least some timing values of the second timing pattern and creating new data values of the second performance metric data for at least some timing values of the first timing pattern.

8. The method of claim 1 wherein the establishing comprises establishing the common representation including a uniform timing pattern including a plurality of timing values separated from adjacent timing values by a uniform amount of time, and the arrangings comprise arrangings of the first performance metric data and the second performance metric data according to the uniform timing pattern of the common representation format.

9. The method of claim 8 wherein at least one of the arrangings comprises disregarding at least some others of the data values of at least one of the first performance metric data and the second performance metric data.

10. The method of claim 1 wherein the accessings comprise accessing the first performance metric data and accessing the second performance metric data individually comprising data regarding storage operations of respective ones of the first storage system and the second storage system.

11. The method of claim 1 further comprising displaying the first performance metric data and the second performance metric data after the arrangings.

12. The method of claim 1 wherein the accessings comprise accessings of the first and the second performance metric data of the first and the second storage systems comprising RAID storage systems.

13. A storage system performance monitoring system comprising:
   a communications interface configured to access first performance metric data comprising a plurality of data values with respect to a first storage system configured to store digital data and second performance metric data comprising a plurality of data values with respect to a second storage system configured to store digital data; and
   processing circuitry configured to access the first performance metric data and the second performance metric data, to provide a plurality of timing values, and to provide one of the data values of the first performance metric data and one of the data values of the second performance metric data for individual ones of the timing values.

14. The system of claim 13 wherein the processing circuitry is configured to provide the timing values in a timing pattern including timing values for respective ones of the data values of the first performance metric data and the second performance metric data.

15. The system of claim 13 wherein the processing circuitry is configured to access the first performance metric data including the respective data values provided according to a first timing pattern and to access the second performance metric data including the respective data values provided according to a second timing pattern different than the first timing pattern.

16. The system of claim 15 wherein the processing circuitry is configured to create new data values for a respective one of the first performance metric data and the second performance metric data corresponding to timing values of the other of the first timing pattern and the second timing pattern.

17. The system of claim 15 wherein the processing circuitry is configured to create new data values of the first performance metric data for at least some timing values of the second timing pattern and to create new data values of the second performance metric data for at least some timing values of the first timing pattern.

18. The system of claim 13 wherein the processing circuitry is configured to provide the timing values comprising uniform timing values separated from adjacent timing values by a uniform amount of time.

19. The system of claim 18 wherein the processing circuitry is configured to disregard at least some of the data values of at least one of the first performance metric data and the second performance metric data.

20. The system of claim 13 wherein the processing circuitry is configured to access the first performance metric data and the second performance metric data individually comprising data regarding storage operations of respective ones of the first storage system and the second storage system.

21. The system of claim 13 further comprising a display configured to depict the timing values and to depict the data values of the first performance metric data and the data values of the second performance metric data which correspond to the depicted timing values.

22. A data storage system comprising:
a first storage means for storing digital data and providing first performance metric data comprising a plurality of data values with respect to storage operations of the first storage means;
a second storage means for storing digital data and providing second performance metric data comprising a plurality of data values with respect to storage operations of the second storage means; and
a performance monitoring means for accessing the: first performance metric data and the second performance metric data, providing a common representation format responsive to the accessed first performance metric data and the second performance metric data, and arranging the first performance metric data and the second performance metric data according to the common representation format.

23. The system of claim 22 wherein the performance monitoring means comprises means for defining the common representation format comprising a plurality of timing values and providing one of the data values of the first performance metric data and the one of the data values of the second performance metric data for individual ones of the timing values.

24. The system of claim 22 wherein the performance monitoring means comprises means for defining the common representation format comprising a plurality of timing values individually corresponding to a timing value of one of the first performance metric data and the second performance metric data.

25. The system of claim 24 wherein the performance monitoring means comprises means for defining the timing values of the common representation format responsive to the timing values of the first and the second performance metric data comprising different timing patterns.

26. The system of claim 22 wherein the performance monitoring device means comprises means for defining the common representation format comprising a plurality of timing values according to a uniform timing pattern having the timing values separated from adjacent timing values by a uniform amount of time.

27. The system of claim 26 wherein the uniform timing pattern is independent of timing patterns of the first and the second performance metric data.

28. The system of claim 22 wherein the first storage means and the second storage means comprise means for storing digital data independent from one another.

29. The system of claim 22 wherein the first storage means and the second storage means comprise RAID storage systems configured to store digital data independent from one another.

30. An article of manufacture comprising:
a processor-usable medium comprising processor-usable code configured to cause processing circuitry to:
access first performance metric data comprising a plurality of data values with respect to a first storage system configured to store digital data;
access second performance metric data comprising a plurality of data values with respect to a second storage system configured to store digital data;
provide a plurality of timing values; and
associate one of the data values of the first performance metric data and one of the data values of the second performance metric data with individual ones of the timing values.

31. The article of claim 30 wherein the processor-usable medium comprises processor-usable code configured to cause the processing circuitry to provide individual ones of the timing values for individual ones of the data values of the first performance metric data and the data values of the second performance metric data.

32. The article of claim 30 wherein the processor-usable medium comprises processor-usable code configured to cause the processing circuitry to access the first performance metric data including the data values provided according to a first timing pattern and to access the second performance metric data including the data values provided according to a second timing pattern different than the first timing pattern.

33. The article of claim 32 wherein the processor-usable medium comprises processor-usable code configured to cause the processing circuitry to create new data values for a respective one of the first performance metric data and the second performance metric data corresponding to timing values of the other of the first timing pattern and the second timing pattern.

34. The article of claim 32 wherein the processor-usable medium comprises processor-usable code configured to cause the processing circuitry to create new data values of the first performance metric data for at least some timing values of the second timing pattern and to create new data values of the second performance metric data for at least some timing values of the first timing pattern.

35. The article of claim 30 wherein the processor-usable medium comprises processor-usable code configured to cause the processing circuitry to provide the timing values comprising uniform timing values separated from adjacent timing values by a uniform amount of time.

36. The article of claim 35 wherein the processor-usable medium comprises processor-usable code configured to cause the processing circuitry to disregard at least one of the data values of at least one of the first performance metric data and the second performance metric data.

37. The article of claim 30 wherein the processor-usable medium comprises processor-usable code configured to cause the processing circuitry to access the first performance metric data and the second performance metric data individually comprising data values regarding storage operations of respective ones of the first storage system and the second storage system.

38. The method of claim 1 wherein the establishing comprises establishing the common representation format comprising a plurality of sequential timing values and the arrangings individually comprise associating respective ones of the data values corresponding to the timing values with the respective timing values.

39. The method of claim 2 wherein the first and the second timing patterns individually comprise a plurality of timing values, and the first performance metric data comprises the respective data values individually corresponding to respective ones of the timing values of the first timing pattern and the second performance metric data comprises the respective data values individually corresponding to respective ones of the timing values of the second timing pattern.

40. The method of claim 39 wherein the common representation format comprises a plurality of timing values corresponding to at least some of the timing values of the first and the second timing patterns.

41. The method of claim 4 wherein the timing values comprise a plurality of sequential timing values arranged according to sequential moments in time.

* * * * *

UNITED STATES PATENT AND TRADEMARK OFFICE
CERTIFICATE OF CORRECTION

PATENT NO. : 6,988,054 B2 Page 1 of 1
APPLICATION NO. : 10/307023
DATED : January 17, 2006
INVENTOR(S) : Robert Giffords It is certified that error appears in the above-identified patent and that said Letters Patent is hereby corrected as shown below:

In column 10, line 6, in Claim 5, after "and" delete "the".

In column 11, line 44, in Claim 22, after "the" delete ":".

In column 11, line 56, in Claim 23, after "and" delete "the".

Signed and Sealed this

Thirteenth Day of July, 2010

David J. Kappos
*Director of the United States Patent and Trademark Office*